July 16, 1968 C. B. FITES 3,393,018
CONTROL VALVE AND SYSTEMS
Filed Oct. 23, 1965 2 Sheets-Sheet 1

INVENTOR
CYRIL B. FITES
BY
*Joseph E. Papin*

INVENTOR
CYRIL B. FITES

United States Patent Office 3,393,018
Patented July 16, 1968

3,393,018
CONTROL VALVE AND SYSTEMS
Cyril B. Fites, Florissant, Mo., assignor, by mesne assignments, to Wagner Electric Corporation, South Bend, Ind., a corporation of Delaware
Filed Oct. 23, 1965, Ser. No. 503,389
15 Claims. (Cl. 303—13)

ABSTRACT OF THE DISCLOSURE

A control valve for a dual fluid pressure system having a pair of separated flow passages therein, a pair of valve means permitting the passage of displaced fluid pressure through said flow passages and obviating the return of the displaced fluid pressure, respectively, and control means movable in response to control fluid pressure selectively supplied thereto to maintain said valve means in open positions permitting both displacement and return pressure fluid flow through said flow passages.

---

Figure 1:
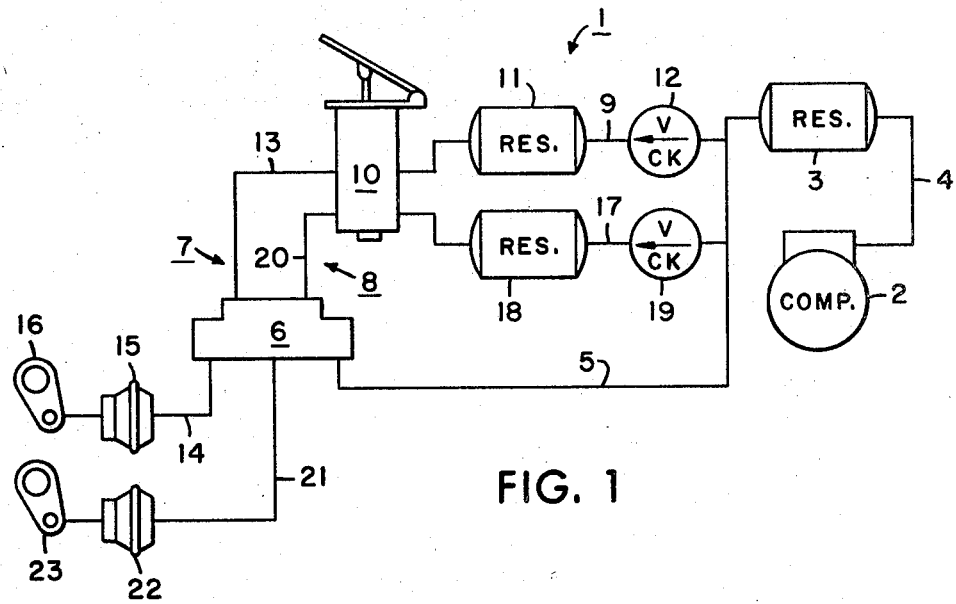

This invention relates to a dual fluid pressure system and in particular to control valves thereof having emergency means therein for automatically retaining said fluid pressure system in its actuated position.

In the past, for increased safety, various types of dual or branch fluid pressure systems have been provided on vehicles. Some of these prior art fluid pressure systems have been provided with means therein for automatically applying the vehicle brakes and for retaining said brakes in their actuated positions if the fluid pressure in the system dropped below a predetermined value because of a leak or rupture in the system. However, by applying the brakes automatically and without the vehicle operator's knowledge, these prior art fluid pressure systems had the undesirable feature of an unexpected braking application whereby the possibility of loss of operator control of the vehicle was established. Other prior art dual fluid pressure systems made no provision during a braking application for retaining the brakes in their actuated positions so that these systems had the undesirable feature of permitting the operator to release the brakes even when there was not sufficient fluid pressure available for another application.

It is, therefore, a general object of the present invention to provide a fluid pressure system having a control valve therein which overcomes the aforementioned undesirable features.

Another object of the present invention is to provide a control valve for use in a dual fluid pressure system which retains the brakes in their activated positions during a braking application if the fluid pressure in the system falls below a predetermined value.

Another object of the present invention is to provide a control valve for use in a dual fluid pressure system which does not affect pressure fluid flow in the system if the fluid pressure in the system is above a predetermined value and which retains the brakes in their activated positions during a braking application if the fluid pressure in said system is reduced below the predetermined value.

Briefly, the present invention comprises a fluid pressure system having a pair of fluid pressure branches, each of said branches having a fluid pressure source and a fluid pressure motor therein, application means in said branches and controlling the application of pressure fluid from said sources to said motors, respectively, and a control valve between said application means and said motors having means therein movable in response to fluid pressure at said sources below a predetermined value to a position retaining said motors in their applied positions during a braking application.

Figure 2:
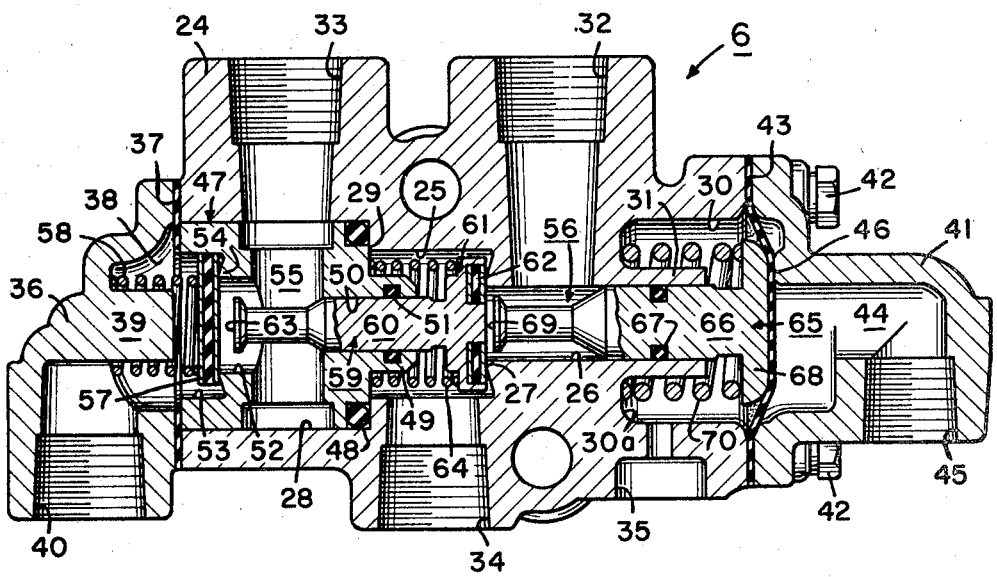
Figure 3:
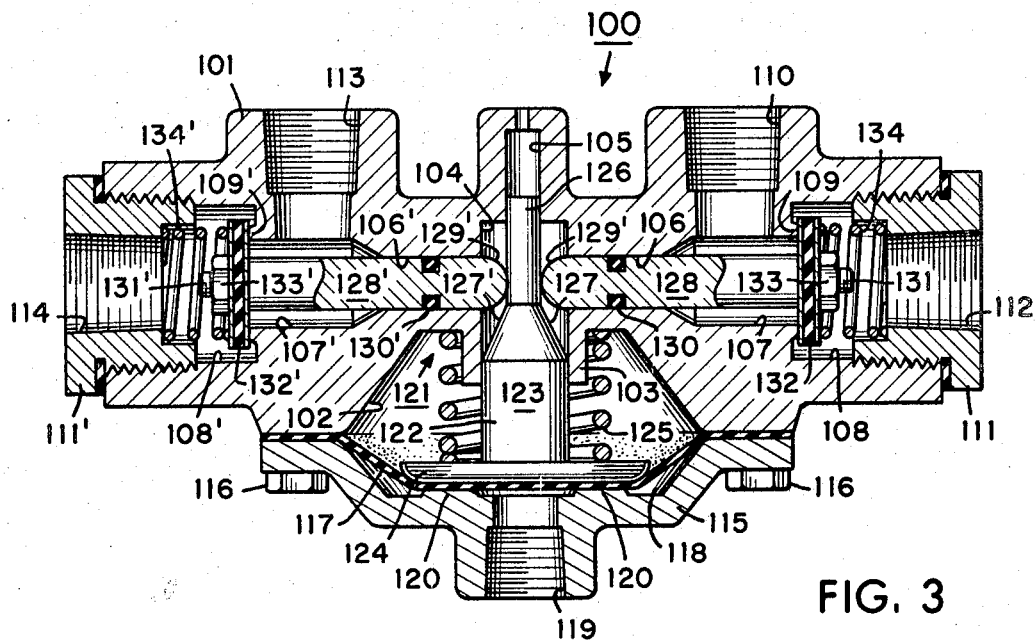
Figure 4:
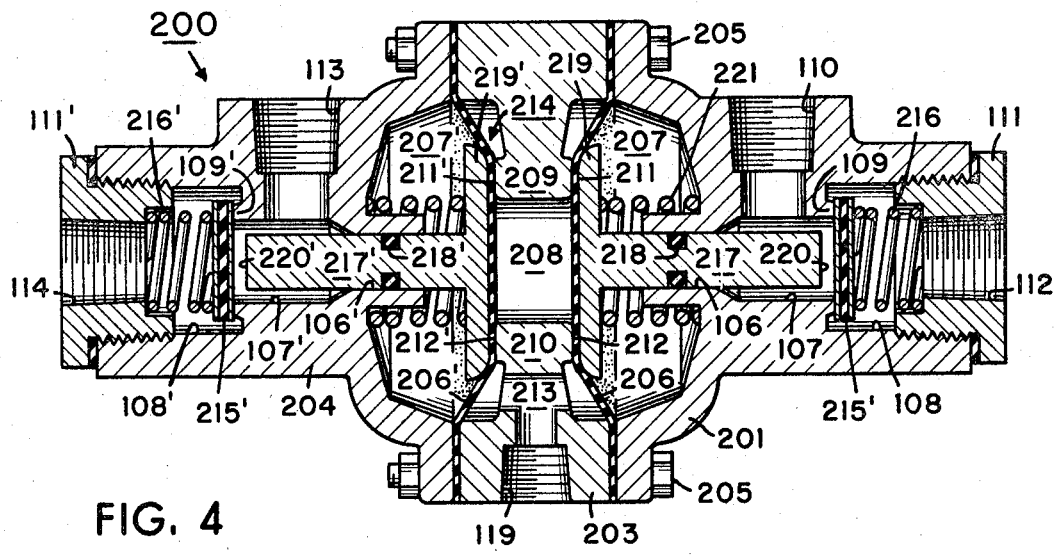

In the drawings which illustrate embodiments of the invention:

FIG. 1 is a diagrammatic view of a fluid pressure system having control valve means therein embodying the present invention, FIG. 2 is an enlarged cross-section view of the control valve of FIG. 1, FIG. 3 is an enlarged cross-sectional view of another embodiment of the present invention, and FIG. 4 is an enlarged cross-sectional view of still another embodiment of the present invention.

Referring now to the drawings and in particular to FIG. 1, a dual or separate fluid pressure system 1 for a vehicle is shown having fluid pressure generating means or a compressor 2 connected with a system or main reservoir 3 by means of a conduit 4. A delivery or emergency conduit 5 has one end connected with the main reservoir 3 and the other end thereof connected to the emergency port of a control or emergency brake retention valve 6. The fluid pressure system 1 is also provided with separate fluid pressure branches, indicated generally at 7 and 8, for connection with separate axle sets of vehicle wheel brake assemblies (not shown). The branch 7 includes a conduit 9 connected in parallel circuit relation between the delivery line 5 and one of a pair of inlet ports in a tandem or split application valve 10 with a branch reservoir 11 and a uni-directional check valve 12 being interposed in the conduit 9, and said check valve provides uni-directional pressure fluid flow from the main reservoir 3 to the branch reservoir 11. The application valve 10 is also provided with a pair of separate outlet ports, and an application line or conduit 13 connects one of said outlet ports with one of a pair of inlet ports in the control valve 6. Another conduit 14 connects one of a pair of outlet ports in the control valve 6 with a fluid pressure responsive motor or brake chamber 15 which is operatively connected with linkage means, such as a slack adjustor 16, to control the energization of a friction device or wheel brake assembly on one of the vehicle axles (not shown). The branch 8 includes a conduit 17 connected in parallel circuit relation between the delivery line 5 and the other of the inlet ports of the application valve 10, with a branch reservoir 18 being interposed therein, and a uni-directional check valve 19 is connected in the conduit 17 to provide uni-directional pressure fluid flow from the main reservoir 3 to the branch reservoir 18. An application conduit 20 has one end connected with the other outlet port of the application valve 10, and the other end of said application conduit is connected with the other of the inlet ports of the control valve 6. Another conduit 21 connects the other of the outlet ports of the control valve 6 with a fluid pressure responsive motor or brake chamber 22 which is operatively connected with linkage means, such as a slack adjustor 23, to control the energization of a friction device or wheel brake assembly on the other of the vehicle axles (not shown).

Referring now to FIG. 2, the control valve 6 is provided with a housing 24 having stepped bores 25, 26 axially aligned therein and providing an annular shoulder or valve seat 27 at the juncture thereof. A counterbore 28 is provided through the leftward end of the housing 24 and connects with the leftward end of the larger stepped bore 25 providing an annular shoulder or abutment 29 at the juncture thereof. An annular groove 30 is provided through the rightward end of the housing 24 radially outwardly of the smaller bore 26 and said groove is closed on its leftward end by a wall portion 30a of the housing 24, and an annular extension 31 is provided on the housing 24 intermediate said bore and said groove. An inlet port 32 which receives the conduit 20, as previously mentioned, is provided in the housing 24 connecting with the bore 26 adjacent to the valve seat 27, and another inlet port 33 which receives the conduit 13, as previously mentioned, is provided in the housing 24 connecting with the counterbore 28 adjacent to the mid-portion thereof. An outlet port 34 which receives the conduit 21, as previously mentioned, is provided in the housing 24 connecting with the larger bore 25 adjacent to the shoulder 29, and a vent 35 is also provided in the housing 24 and connects with the annular groove 30 adjacent to the leftward end wall portion 30a thereof. A cap member 36 is connected to the leftward end of the housing 24 by suitable means, such as screws threadedly received in said housing (not shown), and a seal 37 is provided between said cap and said housing to insure a pressure fluid tight seal therebetween. A closed axial chamber 38 is provided in the cap 36 substantially coaxial with the counterbore 28 in the housing 24 and said cap includes spring guide 39 which extends coaxially into the chamber 38. An outlet port 40 which receives the conduit 14, as previously mentioned, is provided in the cap 36 and connects with the chamber 38 adjacent to the closed end thereof. Another cap member 41 is connected to the rightward end of the housing 24 by suitable means, such as screws 42 threadedly received in said housing, and a flexible diaphragm 43 is mounted therebetween. The cap 41 is provided with an emergency fluid pressure or control chamber 44 and an emergency or control port 45 which receives the conduit 5, as previously mentioned, connects with the chamber 44 adjacent to the rightward end thereof. Also, the cap 41 provides a wall portion or abutment 46 for abutting engagement with the diaphragm 43.

A spool member 47 is provided in the housing counterbore 28 with the leftward end of said spool member abutting the cap 36 and the seal 37, and the rightward end of said spool member abutting the annular shoulder 29, and a seal 48 is provided in the rightward end of said spool member for sealing engagement with said annular shoulder. Also, the rightward end of the spool member 47 is provided with an integral valve actuator guide extension 49 which protrudes coaxially into the larger bore 25, and an axial guide bore 50 through the extension 49 is provided with an annular seal 51 adjacent to the rightward end thereof. Axially aligned bore and counterbore 52, 53 are provided in the spool member 47 substantially coaxial with the guide bore 50, and said bore and counterbore define an annular shoulder or valve seat 54 at the juncture thereof. The bore 52 connects with the leftward end of the guide bore 50, and the counterbore 53 is provided through the leftward end of the spool member 47 and is substantially coaxial with the chamber 38 in the cap 36. A cross-passage 55 which is in constant pressure fluid communication with the inlet port 33 is provided in the spool member 47 and connects with the bore 52 adjacent to the juncture of the bores 50 and 52.

Pressure fluid flow between the inlet ports 32, 33 and their respective outlet ports 34, 40 is controlled by a valve combination, indicated generally at 56. The valve combination 56 includes a valve member 57 in the counterbore 53 of the spool member 47 and said valve member is urged into engagement with the valve seat 54 by a spring 58 which is provided in concentric relation with the guide 39 and biased between the cap 36 and said valve member. Also included in the valve combination 56 is a valve actuator 59 having a body portion 60 which is slidably received in the bore 50 and is sealably engaged by the seal 51. An enlarged head portion 61 is integrally provided on the rightward end of the actuator body portion 60, and an annular seal or valve member 62 is connected to said head portion adjacent to the periphery thereof by suitable means, such as bonding, for sealing engagement with the valve seat 27. The leftward end 63 of the actuator body portion 60 is abuttingly engageable with the valve member 57, and a spring 64, which is provided in concentric relation with the guide extension 49 and biased between the actuator head portion 61 and the rightward end of the spool member 47, urges the valve actuator 59 rightwardly to space the leftward end 63 away from the cooperating valve member 57 and to sealably engage the valve member 62 with the valve seat 27. In addition, the valve combination 56 includes another valve actuator 65 having a body portion 66 slidably received in the bore 26, and a peripheral seal 67 adjacent to the mid-portion of said body portion provides sealing engagement with said bore. An enlarged head 68 is integrally provided on the rightward end of the actuator body portion 66 for engagement with the diaphragm 43, and the leftward end 69 of said actuator body portion is abuttingly engageable with the valve member 62 and the head portion 61 of the actuator 59. A spring 70 is provided in concentric relation with the annular extension 31 and is biased between the housing end wall 30a and the actuator head 68 maintaining said actuator head in engagement with the flexible diaphragm 43 and normally urging said diaphragm into engagement with the abutment 46 of the cap 41 and normally urging the leftward end 69 away from the cooperating valve member 62.

In the operation of the control valve 6 with the component parts thereof positioned as hereinabove described and as shown in FIG. 2, there is little or no fluid pressure in the system 1. When the compressor 2 commences to displace pressure fluid into the system 1, said displaced pressure fluid flows through the conduit 4 into the main reservoir 3 and therefrom through the conduit 5 into the control port 45 and the fluid pressure chamber 44 of the control valve 6. Also, the fluid pressure flows from the conduit 5 through the conduit 9, the uni-directional valve 12 and into the reservoir 11 of the branch 7, and through the conduit 17, the uni-directional valve 19 and into the reservoir 18 of the branch 8. Since the fluid pressure chamber 44 is directly connected to the main reservoir 3, any fluctuation in fluid pressure in said main reservoir will directly affect the fluid pressure in said chamber. When the fluid pressure in the main reservoir 3 and the fluid pressure chamber 44 is above a predetermined value, the force created by the predetermined fluid pressure in the chamber 44 acting on the effective area of the diaphragm 43 overcomes the force of the spring 70 thereby serving to urge the valve actuator 65 leftwardly to a position abuttingly engaging the head portion 68 with the rightward end of the annular extension 31. This leftward movement of the valve actuator 65 abuttingly engages the leftward end 69 with the valve member 62 and head portion 61 of the actuator 59 whereby the force of the spring 64 is overcome and the actuator 59 is moved leftwardly to unseat the valve member 62 from the valve seat 27 and establish unobstructed pressure fluid communication between the inlet and outlet ports 32, 34 through the stepped bores 26, 25 in the housing 24. This leftward movement of the valve actuator 59 abuttingly engages the leftward end 63 thereof with the valve member 57 whereby the force of the spring 58 is overcome and said valve member is unseated from the valve seat 54 to establish unobstructed pressure fluid communication between the inlet port 33 and the outlet port 40 through the cross-passage 55, the bore and counterbore 52, 53 of the spool member 47 and the chamber 38 in the cap 36.

Therefore, when sufficient fluid pressure is available in the system 1 for a safe brake application, the valve members 57 and 62 are unseated from their respective valve seats 54 and 27, as hereinabove described, and the control valve 6 permits unrestricted pressure fluid flow through the branches 7 and 8. Thus, under normal operating conditions, the control valve 6 provides open pressure fluid communication therethrough for the branches 7 and 8 of the system 1, and the operator may apply and release the brakes without the control valve 6 affecting the operation of said fluid pressure system. If the operator desires to effect a braking application, a manually applied force to the application valve 10 establishes pressure fluid flow in the branch 7 from the reservoir 11 into the conduit 13 and through the inlet port 33 of the control valve 6 and therefrom through the cross-passage 55, the bore and counterbore 52, 53 of the spool member 47, the chamber 38 in the cap 36 and the outlet port 40 into the conduit 14 to actuate the brake chamber 15 which, in turn, rotates the slack adjustor 16 to energize the wheel brake assemblies associated therewith. In addition, the manually applied force to the application valve 10 establishes pressure fluid flow in the branch 8 from the reservoir 18 into the conduit 20 and through the inlet port 32 of the control valve 6 and therefrom through the stepped bores 26, 25 in the housing 24 and the outlet port 34 into the conduit 21 to actuate the brake chamber 22 which, in turn, rotates the slack adjustor 23 to energize the wheel brake assemblies associated therewith substantially simultaneously with the wheel brake assemblies associated with the fluid pressure branch 7. When the desired braking effect is obtained, the manually applied force is removed from the application valve 10 preventing further pressure fluid flow therethrough from the branch reservoirs 11 and 18, and the displaced fluid pressure energizing the wheel brake assemblies associated with the fluid pressure branches 7 and 8 returns through said branches, retracing the path followed for energization, to the application valve 10 where the fluid pressure is then exhausted to the atmosphere.

In the event of fluid pressure failure due to leaks or the like in one of the system branches 7 or 8, it is obvious that the fluid pressure in the main reservoir 3 and the fluid pressure chamber 44 will be reduced in an attempt to replenish the depleted fluid pressure in one of the branch reservoirs 11, 18 while the fluid pressure in the other of said branch reservoirs will not be depleted because of the check valves 12, 19 respectively connected therewith. Also, if a leak occurs in the main reservoir 3 or the compressor 2 fails, the fluid pressure in chamber 44 will be reduced while the check valves 12, 19 will prevent the fluid pressure in the chambers 11, 18, respectively, from being depleted. When the fluid pressure in the fluid pressure chamber 44 is reduced below the predetermined value, the force of the spring 70 urges the valve actuator 65 rightwardly to engage the diaphragm 43 with the abutment 46, and to space the leftward end 69 of said actuator away from the valve member 62 and the head 61 of the actuator 59. When the actuator 65 is moved to its rightward position, the spring 64 urges the actuator 59 rightwardly to sealably engage the valve member 62 with the valve seat 27 and to space the leftward end 63 of said actuator away from the valve member 57. With the actuator 59 in its rightward position, the valve member 57 is urged into sealing engagement with the valve seat 54 by the spring 58. Thereafter, when the operator desires to effect a braking application, the manually applied force to the application valve 10 will establish pressure fluid flow from the branch reservoirs 11, 18 into the inlet ports 33, 32, respectively, of the control valve 6. This displaced fluid pressure acts on the rightward faces of the valve members 57, 62, respectively, to urge said valve members leftwardly from their respective valve seats 54, 27 thereby establishing pressure fluid flow through the control valve 6 to the brake chambers 15, 22, respectively, for energization of the brake assemblies associated therewith, as described hereinabove. It should be noted that even if fluid pressure exists in only one of the branches 7 or 8, an effective braking application may be made since the valve members 57, 62 move independently from their respective valve seats 54, 27 so that pressure fluid flow to their respective brake chambers 15, 22 is established in one of the branches irrespective of the operation of the other branch. When the manually applied force to the application valve 10 is removed, the displaced fluid pressure acting on the rightward faces of the valve members 57, 62 is eliminated and said valve members are urged into engagement with their respective valve seats 54, 27 by the springs 58, 64, respectively. With the valve members 57, 62 engaging their respective valve seats 54, 27, the pressure fluid flow between the outlet ports 40, 34 and the inlet ports 33, 32, respectively, is restricted or obstructed so that the displaced pressure fluid cannot return to the application valve 10 and be vented to the atmosphere. Therefore, the displaced fluid pressure is retained in the system between the control valve 6 and the brake chambers 15, 22, respectively, to retain the brakes associated therewith in their activated or energized positions.

Referring now to FIG. 3, another control valve 100 is shown therein which functions in the fluid pressure system 1 in substantially the same manner as the previously described control valve 6.

The control valve 100 is provided with a housing 101 having a chamber 102 in the mid-portion of said housing. The housing 101 is provided with an integral guide portion 103 protruding coaxially into the chamber 102 and having vertically extending stepped bores 104, 105 therethrough. The larger stepped bore 104 connects with the chamber 102, and the smaller stepped bore 105 is closed at its upper end by the housing 101. The rightward side of the housing 101 is provided with axially aligned stepped bores 106, 107, and the smaller stepped bore 106 connects with the rightward side of the vertical bore 104 adjacent to the mid-portion thereof. A counterbore 108 extends through the rightward end of the housing 101 and connects with the rightward end of the bore 107, and an annular shoulder or valve seat 109 is provided at the juncture thereof. An inlet port 110 which receives the conduit 20, as previously mentioned, is provided in the housing 101 connecting with the bore 107 adjacent to the mid-portion thereof. A plug member 111 is threadedly received in the counterbore 108, and an outlet port 112 which receives the conduit 21, as previously mentioned, is provided in said plug member and connects with said counterbore. The leftward side of the housing 101 is substantially identical with the rightward side of said housing and provides axially aligned stepped bores 106', 107' connecting with a counterbore 108' to define a radial shoulder or valve seat 109' at the intersection of the bore and counterbore 107', 108'. An inlet port 113 which receives the conduit 13, as previously mentioned, is provided in the housing 101 connecting with the bore 107' adjacent to the mid-portion thereof. A plug member 111' is threadedly received in the counterbore 108', and an outlet port 114 which receives the conduit 14, as previously mentioned, is provided in said plug member and connects with said counterbore. A cap member 115 is connected to the bottom of the housing 101 by suitable means, such as screws 116 threadedly received in said housing, and a flexible diaphragm 117 is provided therebetween to serve as the bottom wall of the chamber 102. The diaphragm 117 and cap 115 form a control chamber 118, and an emergency or control port 119 which receives the conduit 5, as previously mentioned, is provided in the cap 115 connecting with the chamber 118 adjacent to the mid-portion thereof. The cap 115 also provides a pair of abutment portions 120 protruding into the chamber 118 on opposed sides of the emergency port 119, and the diaphragm 117 is engageable with said abutment portions.

Pressure fluid flow between the inlet ports 110, 113 and the outlet ports 112, 114, respectively, is controlled by a valve combination, indicated generally at 121. The valve combination 121 includes a control member 122 having a body portion 123 movable in the larger stepped bore 104 of the guide 103. An enlarged head portion 124 is integrally provided on the lower end of the control member body portion 123, and a spring 125 is provided in concentric relation with the guide portion 103 and is biased between the housing 101 and the head portion 124, normally maintaining said head portion in engagement with the diaphragm 117 and normally urging said diaphragm into engagement with the abutments 120. The upper end 126 of the control member body portion 123 is movable in the smaller stepped bore 105 of the guide portion 103, and the mid-portion of said control member body portion is provided with opposed camming surfaces 127, 127′. Also included in the valve combination 121 is a valve actuator 128 which is movable in the stepped bores 106, 107 and counterbore 108 in the rightward side of the housing 101. The actuator 128 is provided with a cam follower surface 129 on the leftward end thereof, and an annular seal 130 is provided in said actuator adjacent to the leftward end thereof for sealing engagement with the housing bore 106. The rightward end of the actuator 128 has a threaded portion 131, and a washer-shaped valve member 132 is provided thereon and secured in place by means of a nut 133. A spring 134 which is biased between the plug member 111 and the valve member 132 urges the actuator 128 leftwardly to engage said valve member with the valve seat 109. The valve combination 121 also includes a valve actuator 128′ which is movable in the stepped bores 106′, 107′ and counterbore 108′ in the leftward side of the housing 101. The actuator 128′ is provided with a cam follower surface 129′ on the rightward end thereof, and an annular seal 130′ is provided in said actuator adjacent to the rightward end thereof for sealing engagement with the housing bore 106′. The leftward end of the actuator 128′ has a threaded portion 131′, and a washer-shaped valve member 132′ is provided thereon and secured in place by means of a nut 133′. A spring 134′ which is biased between the plug member 111′ and the valve member 132′ urges the actuator 128′ leftwardly to engage said valve member with the valve seat 109′.

In the operation of the control valve 100, when the fluid pressure in the fluid pressure system 1 attains a predetermined value, the fluid pressure in the chamber 118 acting on the effective area of the diaphragm 117 develops a force which overcomes the force of the spring 125 and thereby serves to move the control member 122 upwardly. With the control member 122 in its upward position, the cam surfaces 127, 127′ act on the cam follower surfaces 129, 129′ of the actuators 128, 128′, respectively, to urge the actuator 128 rightwardly and to urge the actuator 128′ leftwardly. The rightward movement of the actuator 128 spaces the valve member 132 from the valve seat 109 to provide unobstructed pressure fluid flow between the inlet and outlet ports 110, 112, and the leftward movement of the actuator 128′ spaces the valve member 132′ from the valve seat 109′ to provide unobstructed pressure fluid flow between the inlet and outlet ports 113, 114. With the valve members 132, 132′ unseated, the fluid pressure displaced for a braking application from the application valve 10 by the manually applied force flows through the branches 7 and 8 and the control valve 100 to energize the wheel brake assemblies associated with said branches. Also, when the desired braking application is effected and the manually applied force is removed from the application valve 10, the displaced fluid pressure is free to return through the branches 7 and 8 and the control valve 100 to the application valve 10 where the fluid pressure is vented to the atmosphere.

In the event of fluid pressure failure in the fluid pressure system 1, such as failure of the compressor 2 or leaks in the main reservoir 3 or one of the system branches 7 or 8, it is obvious that the fluid pressure in the chamber 118 will be reduced. When the fluid pressure in the chamber 118 falls below the predetermined value, the spring 125 urges the control member 122 downwardly and the cam follower surfaces 129, 129′ of the actuators 128, 128′ follow the cam surfaces 127, 127′, respectively, thereby permitting the actuators 128, 128′ to move toward one another. This movement of the actuators 128, 128′ again seats the valve members 132, 132′ with their respective valve seats 109, 109′. Thereafter, the fluid pressure displaced for a braking application from the application valve 10 by the manually applied force flows through the branches 7 or 8 into the control valve 100 where the fluid pressure acts on the face of the valve members 132 or 132′ to urge said valve members away from their cooperating valve seats 109, 109′ and establish pressure fluid flow through said control valve to energize the wheel brake assemblies associated with said branches. When the desired braking application is effected and the manually applied force is removed from the application valve 10, the displaced fluid pressure acting on the valve members 132, 132′ to urge said valve members from their respective valve seats 109, 109′ is eliminated and said valve members are urged into sealing engagement with their respective valve seats 109, 109′ by the springs 134, 134′. Therefore, the displaced fluid pressure between the control valve 100 and the brake chambers 15 and 22 cannot return to the application valve 10 and be vented to the atmosphere, so that the brakes applied by the fluid pressure in the branches 7 or 8 are retained in their activated or energized positions.

Referring now to FIG. 4, another control valve 200 is shown having substantially the same component parts and functioning in the fluid pressure system 1 substantially in the same manner as the previously described control valve 100 with the following exceptions.

The control valve 200 has a housing 201 including rightward, intermediate and leftward housing portions 202, 203, 204 which are secured together by means of bolts 205 therethrough. A flexible diaphragm 206 is interposed between the rightward and intermediate housing portions 202, 203, and an axial chamber 207 is formed between said diaphragm and said rightward housing portion with the housing bore 106 connecting with the right side of said chamber adjacent to the mid-portion thereof. Another flexible diaphragm 206′ is interposed between the leftward and intermediate housing portions 204, 203, and an axial chamber 207′ is formed between said diaphragm and said leftward housing portion with the housing bore 106′ connecting with the left side of said chamber adjacent to the mid-portion thereof. An emergency fluid pressure chamber 208 is provided between the diaphragms 206, 206′, and the control port 119 is provided through the intermediate housing 203 and connects with the chamber 208. The intermediate housing portion 203 includes upper and lower abutment members 209, 210 which extend into the chamber 208, with the abutment members 209, 210 having opposed sides 211, 211′ and 212, 212′ which are engageable with the diaphragms 206, 206′, respectively. The abutment member 210 also has a cross-passage 213 therethrough connecting the control port 119 with the chamber 208.

Pressure fluid flow between the inlet ports 110, 113 and the outlet ports 112, 114, respectively, is controlled by a valve combination, indicated generally at 214. The valve combination 214 includes a pair of valve members 215, 215′ in the counterbores 108, 108′, respectively. The valve member 215 is urged into sealing engagement with the valve seat 109 by a spring 216 biased between the plug member 111 and the valve member 215, and the valve member 215′ is urged into sealing engagement with the valve seat 109′ by a spring 216′ biased between the plug member 111′ and the valve member 215′. Also, the valve combination 214 includes a pair of valve actuators 217, 217′ respectively movable in the bores 106, 107 and 106′, 107′, and peripheral seals 218, 218′ are provided on said actuators for sealing engagement with the housing bores 106, 106′, respectively. An enlarged head 219 is integrally provided on the leftward end of the actuator 217 for responsive engagement with the diaphragm 204, and the rightward end 220 of said actuator is abuttingly engageable with the valve member 215. A spring 221 is provided in the chamber 207 in concentric relation with the actuator 217 and is biased between the housing 202 and the head 219, normally urging said actuator rightward end away from the cooperating valve member 215 and normally urging the diaphragm 204 into engagement with the abutment portions 211, 212. An enlarged head 219' is integrally provided on the rightward end of the actuator 217' for responsive engagement with the diaphragm 206' and the leftward end 220' of said actuator is abuttingly engageable with the valve member 215'. A spring 221' is provided in the chamber 207' in concentric relation with the actuator 217' and is biased between the housing 204 and the head 219', normally urging said actuator leftward end away from the cooperating valve member 215' and normally urging the diaphragm 204' into engagement with the abutment portions 211', 212.

When the fluid pressure in the fluid pressure system 1 attains a predetermined value, the fluid pressure in the chamber 208 acting on the diaphragms 204, 204' urges the actuators 217, 217' to a position movably engaging their respective valve members 215, 215' and spacing said valve members from the valve seats 109, 109' to provide unobstructed pressure fluid flow between the inlet ports 110, 113 and outlet ports 112, 114, respectively. Should the fluid pressure in the fluid pressure system 1 drop below the predetermined value, the actuators 217, 217' are disengaged from their respective valve members 215, 215' and said valve members are re-engaged with their valve seats 109, 109' whereby said valve members permit pressure fluid flow through the control valve 200 in the brake energizing direction but prevent the return flow of pressure fluid from said brakes so that said brakes will be retained in their energized positions.

The embodiments of the invention in which an exclusive property or privilege is claimed are defined as follows:

1. A fluid pressure system comprising a fluid pressure source and a fluid pressure responsive motor, a main source of fluid pressure connected in uni-directional pressure fluid flow relation with said first named source, means for selectively effecting the application of fluid pressure from said first named source to said motor and the exhaustion of the applied fluid pressure from said motor, valve means between said last named means in said motor, and other means responsive to a fluid pressure at said main source in excess of a predetermined value to move said valve means toward a position permitting the flow of applied fluid pressure to said motor and the exhaustion of applied fluid pressure therefrom and also responsive to fluid pressure at said main source less than the predetermined value to permit movement of said valve means toward another position permitting the flow of applied fluid pressure to said motor and preventing the exhaustion of the applied fluid pressure from said motor.

2. A fluid pressure system comprising a pair of system branches each having a fluid pressure source and a fluid pressure responsive motor therein, a main source of fluid pressure connected with each of said branch sources in pressure fluid supplying relation only, application means in said branches for selectively effecting the application of fluid pressure from said branch sources to said branch motors and for effecting the exhaustion of the applied fluid pressure from said branch motors, respectively, and means including a pair of pressure fluid flow passages respectively connected in said branches between said application means and said motors, a pair of valve means controlling said flow passages, and other means responsive to fluid pressure at said main source above a predetermined value to move said valve means to positions in said flow passages providing pressure fluid flow therethrough in the application and exhaustion directions, and said other means being responsive to fluid pressure at said main source less than the predetermined value to permit movement of said valve means to positions in said flow passages providing pressure fluid flow therethrough in only the application direction.

3. A fluid pressure system comprising a pair of system branches each having a fluid pressure source and a fluid pressure responsive motor therein, a main source of fluid pressure connected in uni-directional pressure fluid flow relation with each of said branch sources, application means in said branches for selectively effecting the application of fluid pressure from said branch sources to said branch motors and the exhaustion of the applied fluid pressure from said branch motors, and control means connected in said branches between said application means and said branch motors including an expansible fluid pressure chamber connected in pressure fluid communication with said main source, and valve means movable in response to fluid pressure in said chamber for controlling said branches, said valves means being movable in response to fluid pressure in said chamber above a predetermined value to a position permitting unobstructed application and exhaustion pressure fluid flow through said branches, and said valve means also being movable in response to fluid pressure in said chamber below the predetermined value to a position permitting only the passage of application pressure fluid flow through said branches to said motors and preventing exhaustion pressure fluid flow therethrough from said motors.

4. A fluid pressure system comprising a pair of system branches each having a fluid pressure source and a fluid pressure responsive motor therein, a main source of fluid pressure connected in uni-directional pressure fluid flow relation with each of said branch sources, application means in said branches for selectively effecting the application of fluid pressure from said branch sources to said branch motors and the exhaustion of the applied fluid pressure from said branch motors to the atmosphere, control means including a pair of pressure fluid flow passages connected in said branches between said application means and said branch motors, an expansible fluid pressure chamber in said control means and connected with said main source, first valve means in one of said flow passages controlling pressure fluid flow therethrough, second valve means in the other of said flow passages controlling pressure fluid flow therethrough and extending into said one flow passage for driving engagement with said first valve means, and other means movable in said chamber and extending into said other flow passage for driving engagement with said second valve means, said other means being movable in response to fluid pressure in said chamber above a predetermined value to effect the driving engagement thereof with said second valve means and the driving engagement of said second valve means with said first valve means and move said first and second valve means to open positions in said flow passages permitting unobstructed flow therethrough of the applied fluid pressure and the exhaustion of the applied fluid pressure, and said other means also being movable in response to fluid pressure in said chamber below the predetermined value to another position disengaged from said second valve means, resilient means urging said second valve means to a closed position in said other flow passage upon the disengagement of said other means therefrom and disengaging said second valve means from said first valve means, and other resilient means urging said first valve means to a closed position in said one flow passage upon the disengagement of said second valve means therefrom, said first and second valve means being movable against said first named and other resilient means from their closed positions to permit the passage of applied fluid pressure through said flow passage and said first named and other resilient means maintaining said first and second valve means in their closed positions to obviate the exhaustion of the applied fluid pressure from said motors through said flow passages.

5. A fluid pressure system comprising a pair of system branches each having a fluid pressure source and a fluid pressure responsive motor therein, a main source of fluid pressure connected in uni-directional pressure fluid flow relation with each of said branch sources, application means in said branches for selectively effecting the application of fluid pressure from said branch sources to said branch motors and also the exhaustion of the applied fluid pressure from said branch motors, and control means connected in said branches between said application means and said branch motors, an expansible fluid pressure chamber in said control means and connected with said main source, said control means having a pressure fluid flow passage therethrough for each of said branches, a valve seat on said housing in circumscribing relation with each of said flow passages, first valve means in one of said flow passages controlling pressure fluid flow therethrough, a first valve actuator having end portion for operative engagement with said first valve means, second valve means provided on said first valve actuator controlling pressure fluid flow through the other of said flow passages, a second valve actuator having an end portion responsive to fluid pressure in said chamber and an opposed end portion for operative engagement with said first valve actuator, said second valve actuator being movable in response to fluid pressure in said chamber above a predetermined value to engage and move said first valve actuator whereby said first valve actuator engages and moves said first valve means, said first and second valve means being disengaged from said valve seats upon the movement of said first and second valve actuators in response to fluid pressure in said chamber above the predetermined value permitting unobstructed pressure fluid flow through said one and other flow passages for application and exhaustion of said branch motors, and said second valve actuator also being movable in response to fluid pressure in said chamber below the predetermined value toward a position disengaged from said first valve actuator to permit following movement of said first valve actuator to a position disengaged from said first valve means whereby said first and second valve means are urged into engagement with said valve seats to prevent pressure fluid flow through said one and other flow passages for exhaustion of said branch motors and permit pressure fluid flow through said one and other flow passages for application of said branch motors.

6. A control valve comprising a housing having a control port and a pair of inlet and outlet ports therein, an expansible fluid pressure chamber in said housing and connected with said control port, a first flow passage through said housing connected between one of said inlet and outlet ports, a second flow passage through said housing connected between the other of said inlet and outlet ports, a valve seat on said housing in circumscribing relation with each of said flow passages, first valve means in said first flow passage controlling pressure fluid flow therethrough, first resilient means urging said first valve means into engagement with one of said valve seats, a first valve actuator having an end portion for operative engagement with said first valve means, second valve means provided on the opposed end portion of said first valve actuator controlling pressure fluid flow through said second flow passage, second resilient means urging said second valve means into engagement with the other of said valve seats, a second valve actuator having an end portion responsive to fluid pressure in said chamber and an opposed end portion for operative engagement with said second valve means, said second valve actuator being movable in response to fluid pressure in said chamber above a predetermined value to engage and move said second valve means toward a position disengaged from said one valve seat permitting unobstructed pressure fluid flow through said first flow passage, said first valve actuator being movable upon the actuation of said second valve means by said second valve actuator to engage and move said first valve means toward a position disengaged from said other valve seat to also permit unobstructed pressure fluid flow through said second flow passage, and said second valve actuator also being movable in response to fluid pressure in said chamber below the predetermined value to a position disengaged from said second valve means wherein said first resilient means urges said one valve means into engagement with said one valve seat and said second valve means urges said other valve means into engagement with said other valve seat and disengages said first valve actuator from said first valve means, said first and second valve means preventing pressure fluid flow from said one and other outlet ports to said one and other inlet ports when engaged with said one and other valve seats and said first and second resilient means being yieldable in response to fluid pressure at said one and other inlet ports acting on said first and second valve means to permit pressure fluid flow from said one and other inlet ports to said one and other outlet ports, respectively.

7. A control valve comprising a housing, a pair of separated passage means in said housing for displacement and return pressure fluid flow therethrough, a pair of valve means controlling said pair of passage means, respectively, said pair of valve means being movable upon subjection to displacement pressure fluid flow toward open positions in said pair of passage means permitting passage of the displacement pressure fluid flow therethrough and said pair of valve means also being urged upon subjection to the return flow of the displaced fluid pressure toward closed positions in said pair of passage means obviating passage of the return flow of the displaced fluid pressure therethrough, fluid pressure responsive means movable in said housing in response to control fluid pressure supplied thereto to engage and move one of said valve means toward its open position in one of said passage means permitting both displacement and return pressure fluid flow therethrough, and other means movable in said housing for driving engagement between said pair of valve means, said other means being movable in response to the movement of said fluid pressure responsive means and said one valve means to drivingly engage the other of said valve means and move said other valve means toward its open position in the other of said passage means permitting both displacement and return pressure fluid flow therethrough.

8. The control valve according to claim 7, comprising opposed effective input and output areas on said pair of valve means, and a pair of valve seats on said housing in circumscribing relation with said pair of passage means, and resilient means urging said pair of valve means toward their closed positions into engagement with said valve seats, said pair of valve means being movable against said resilient means toward their open positions disengaged from said pair of valve seats in response to an input force created by the displacement flow of fluid pressure acting on said valve means input areas, and said pair of valve means being thereafter urged toward their closed positions in engagement with said pair of valve seats to obviate the return flow of displaced fluid pressure through said pair of passage means by said resilient means and an output force created by the displaced fluid pressure acting on said valve means output areas in opposition to the input force.

9. A control valve comprising a housing, a pair of passage means in said housing for displacement and return pressure fluid flow therethrough, a pair of valve means controlling said passage means, respectively, said pair of valve means being movable upon subjection to displacement flow of fluid pressure toward open positions in said pair of passage means permitting passage of the displacement flow of fluid pressure therethrough and said pair of valve means also being urged upon subjection to the return flow of the displaced fluid pressure toward closed positions in said pair of passage means obviating passage of the return flow of displaced fluid pressure therethrough, resiliently urged means movable in said housing in response to control fluid pressure supplied thereto in excess of a predetermined value to engage and move one of said valve means toward its open position in one of said passage means to maintain the passage of both displacement and return pressure fluid flow therethrough, and other means on said one valve means movable in said housing including extension means extending through said one flow passage into the other of said flow passages, and a free end portion on said extension means in said other flow passage for driving engagement with the other of said valve means, said extension means being movable to drivingly engage said free end portion with said other valve means upon the actuation of said one valve means by said resiliently urged means to move said other valve means toward its open position in said other flow passage to maintain the passage of both displacement and return pressure fluid flow therethrough.

10. The control valve according to claim 9, comprising opposed effective input and output areas on said pair of valve means, a pair of valve seats on said housing in circumscribing relation with said pair of passage means, said resiliently urged means being movable through one of said valve seats to engage and actuate said one valve means and said free end portion being movable through the other of said valve seats to engage and actuate said other valve means, and a pair of valve springs engaged between said housing and said pair of valve means urging said pair of valve means toward their closed positions into engagement with said pair of valve seats, said pair of valve means being movable against said pair of springs toward their open positions disengaged from said pair of valve seats in response to input forces respectively created by the displacement flow of fluid pressure acting on said valve means input areas, and said pair of valve means being thereafter urged toward their closed positions in engagement with said pair of valve seats to obviate the return flow of displaced fluid pressure through said pair of passage means by said pair of springs and output forces respectively created by the displaced fluid pressure acting on said valve means output areas in opposition to the input forces.

11. The control valve according to claim 9, wherein said resiliently urged means comprises piston means movable in said housing and defining therewith an expansible control fluid pressure chamber for subjection to the control fluid pressure, extension means on said piston means movable in said housing and extending into said one flow passage for operative engagement with said one valve means, and spring means biased between said housing and said piston means and opposing fluid pressure expansion of said chamber, said piston means being movable in response to control fluid pressure in excess of the predetermined value in said chamber to engage said extension means with said one valve means and effect actuation thereof.

12. A control valve comprising a housing having a pair of separated pressure fluid flow passages therein, a pair of valve means controlling displacement and return pressure fluid flow through said flow passages, resiliently urged means movable in said housing for subjection to control fluid pressure, said resiliently urged means being movable in response to control fluid pressure in excess of a predetermined value when subjected thereto to engage and move one of said valve means toward a position in one of said flow passages permitting both displacement and return pressure fluid flow therethrough, means on said one valve means extending into the other of said flow passages for driving engagement with the other of said valve means, said other valve means being drivingly engaged and moved by said last named means toward a position in said other flow passage permitting both displacement and return pressure fluid flow therethrough upon the resiliently urged means actuation of said one valve means, said resiliently urged means also being movable in response to control fluid pressure less than the predetermined value when subjected thereto toward a position disengaged from said one valve means, and other resilient means respectively urging said one and other valve means toward other positions in said one and other flow passages permitting only displacement flow therethrough and obviating return flow therethrough when said resiliently urged means is disengaged from said one valve means.

13. A control valve comprising a housing, a pair of separated passage means in said housing for displacement and return pressure fluid flow therethrough, a pair of valve means controlling said pair of passage means, respectively, said pair of valve means being movable upon subjection to displacement pressure fluid flow toward open positions in said pair of passage means permitting passage of the displacement pressure fluid flow therethrough and said pair of valve means also being urged upon subjection to the return flow of the displaced fluid pressure toward closed positions in said pair of passage means obviating passage of the return flow of the displaced fluid pressure therethrough, and resiliently urged means including a pair of opposed piston means movable in said housing and defining therewith an expansible fluid pressure chamber for subjection to the control fluid pressure, a pair of pre-compressed spring means respectively biased between said housing and piston means and opposing fluid pressure expansion of said chamber, a pair of force transmitting means respectively connected with said piston means and movable in said housing, and a pair of end portions on said force transmitting means for driving engagement with said valve means, said piston means being movable against said spring means in response to control fluid pressure in excess of the predetermined value in said chamber acting on the effective area of said piston means to move said force transmitting means and drivingly engage said end portions thereof with said valve means and thereafter move said valve means to their open positions disengaged from said valve seats to maintain both displacement and return flow through said passage means.

14. A control valve comprising a housing, a pair of opposed inlet and outlet chambers in said housing for displacement and return pressure fluid flow therethrough, a pair of valve seats on said housing between said inlet and outlet chambers, respectively, a pair of valve means movable in said housing for engagement with said pair of valve seats, a pair of spring means urging said pair of valve means toward their closed positions into engagement with said pair of valve seats, a pair of opposed effective inlet and outlet areas on said pair of valve means, respectively, said pair of valve means being movable against said pair of spring means toward their open positions disengaged from said pair of valve seats in response to forces created by the displacement flow of fluid pressure from said pair of inlet chambers to said pair of outlet chambers acting on said valve means pair of inlet areas, and said pair of valve means being thereafter urged toward their closed positions in engagement with said pair of valve seats to obviate the return flow of displaced fluid pressure from said pair of outlet chambers to said pair of inlet chambers by the forces of said pair of spring means and forces respectively additive thereto created by the displaced fluid pressure acting on the pair of outlet areas of said pair of valve means in opposition to the first named forces, an expansible control chamber in said housing between said pair of outlet chambers for subjection to the control fluid pressure, and resiliently urged means including a pair of opposed piston means movable in said housing and defining opposed walls of said control chamber, a pair of other spring means biased between said housing and said pair of piston means and opposing fluid pressure expansion of said control chamber, and a pair of extension means on said pair of piston means movable in said housing and extending into said pair of outlet chambers for operative engagement with said pair of valve means, said pair of piston means being movable against said pair of other spring means in response to control fluid pressure in excess of the predetermined value in said control chamber to engage said pair of extension means with said pair of valve means and move said pair of valve means to their open positions disengaged from said pair of valve seats to maintain both displacement and return flow between said pair of inlet and outlet chambers, respectively.

15. A control valve comprising a housing having first interconnected inlet and outlet chambers for displacement and return pressure fluid flow therethrough, second interconnected inlet and outlet chambers in said housing for displacement and return pressure fluid flow therethrough and axially aligned with said first inlet and outlet chambers, first and second valve seats on said housing between said first and second inlet and outlet chambers, first and second valve means for engagement with said first and second valve seats, first and second spring means urging said first and second valve means toward their closed positions into engagement with said first and second valve seats, opposed effective first and second inlet and outlet areas on said first and second valve means, said first and second valve means being movable against said first and second spring means toward their open positions disengaged from said first and second valve seats in response to forces created by the displacement of fluid pressure from said first and second inlet chambers to said first and second outlet chambers acting on said first and second inlet areas, and said first and second valve means being thereafter urged toward their closed positions engaged with said first and second valve seats to obviate the return flow of displaced fluid pressure from said first and second outlet chambers to said first and second inlet chambers by the forces of said first and second spring means and other forces additive thereto created by the displaced fluid pressure acting on said first and second outlet areas in opposition to said first named forces, an expansible fluid pressure control chamber in said housing adjacent to said first inlet chamber and spaced from said second inlet chamber, resiliently urged means including piston means movable in said housing and defining a wall of said control chamber, other spring means contained between said housing and piston means and opposing fluid pressure expansion of said control chamber, extension means on said piston means extending into said first inlet chamber for operative engagement with said first valve means, said piston means being movable against said other spring means in response to the control fluid pressure in excess of a predetermined value in said control chamber to engage said extension means with said first valve means and thereafter move said first valve means toward its open position disengaged from said first valve seat to maintain both displacement and return flow between said first inlet and outlet chambers, other extension means on said first valve means movable in said housing and extending into said second inlet chamber, and a free end on said other extension means in said second inlet chamber for operative engagement with said second valve means, said other extension means being movable upon the actuation of said first valve means by said first named extension means to engage said free end with said second valve means and effect actuation thereof.

References Cited
UNITED STATES PATENTS

| | | | |
|---|---|---|---|
| 2,289,559 | 7/1942 | Turek | 303—63 |
| 2,489,929 | 11/1949 | Raybould | 188—152 |
| 3,265,447 | 8/1966 | Bueler | 303—52 |

MILTON BUCHLER, *Primary Examiner.*

EUGENE BOTZ, *Examiner.*

T. M. BLIX, *Assistant Examiner.*